US011862089B2

(12) United States Patent
Kim

(10) Patent No.: US 11,862,089 B2
(45) Date of Patent: Jan. 2, 2024

(54) SUBPIXEL CIRCUIT, DISPLAY PANEL, AND DISPLAY DEVICE

(71) Applicant: LG DISPLAY CO., LTD., Seoul (KR)

(72) Inventor: CheolSe Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/965,414

(22) Filed: Oct. 13, 2022

(65) Prior Publication Data

US 2023/0197001 A1 Jun. 22, 2023

(30) Foreign Application Priority Data

Dec. 20, 2021 (KR) ........................ 10-2021-0182406

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0852* (2013.01); *G09G 2310/0278* (2013.01); *G09G 2310/08* (2013.01); *G09G 2320/0233* (2013.01)

(58) Field of Classification Search
CPC .. G09G 3/3233; G09G 3/3266; G09G 3/3291; G09G 2300/0852; G09G 2310/0278; G09G 2310/08; G09G 2320/0233
See application file for complete search history.

(56) References Cited

U.S. PATENT DOCUMENTS 6,777,710 B1 * 8/2004 Koyama .............. G09G 3/3266 257/40
7,141,934 B2 * 11/2006 Osame .............. H01L 29/78672 315/169.3

(Continued)

FOREIGN PATENT DOCUMENTS

CN 112967681 A 6/2021
KR 10-2020-0036588 A 4/2020

OTHER PUBLICATIONS

Extended European Search Report dated Mar. 30, 2023, issued in corresponding European Patent Application No. 22202758.3.

*Primary Examiner* — Michael J Jansen, II
(74) *Attorney, Agent, or Firm* — Morgan, Lewis & Bockius LLP

(57) ABSTRACT

A subpixel circuit, a display panel, and a display device are disclosed. A subpixel circuit for operating a subpixel of a display panel may include: a reference circuit configured to receive a high-potential voltage and to output a control voltage for controlling a driving current flowing through a light emitting element; a light emitting circuit including the light emitting element, the light emitting circuit being configured to receive the control voltage and a low-potential voltage and to control the light emitting element based on a driving voltage; an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal.

18 Claims, 15 Drawing Sheets

(56) References Cited

U.S. PATENT DOCUMENTS

| | | | | |
|---|---|---|---|---|
| 7,145,530 | B2 * | 12/2006 | Miyazawa | G09G 3/3233 345/95 |
| 7,218,294 | B2 * | 5/2007 | Koyama | G09G 3/3233 313/504 |
| 7,247,995 | B2 * | 7/2007 | Osame | H10K 59/123 257/66 |
| 7,324,074 | B2 * | 1/2008 | Lee | G09G 3/3233 315/169.3 |
| 7,336,251 | B2 * | 2/2008 | Osada | G09G 3/3241 345/82 |
| 8,026,877 | B2 * | 9/2011 | Osame | H01L 27/1214 345/82 |
| 8,325,167 | B2 * | 12/2012 | Osame | G09G 3/3258 345/204 |
| 8,330,677 | B2 * | 12/2012 | Kim | G09G 3/3233 345/76 |
| 8,552,933 | B2 * | 10/2013 | Koyama | G09G 3/3225 345/76 |
| 8,957,836 | B2 * | 2/2015 | Koyama | G09G 3/3266 345/76 |
| 10,089,934 | B2 * | 10/2018 | Nam | G09G 3/3283 |
| 10,679,552 | B2 * | 6/2020 | Qian | G09G 3/3208 |
| 11,521,547 | B2 * | 12/2022 | Nishiyama | G09G 3/3266 |
| 2003/0189206 | A1 * | 10/2003 | Koyama | G09G 3/3241 257/59 |
| 2003/0197663 | A1 * | 10/2003 | Lee | G09G 3/3233 345/76 |
| 2004/0100427 | A1 * | 5/2004 | Miyazawa | G09G 3/3233 345/76 |
| 2004/0130541 | A1 * | 7/2004 | Osada | G09G 3/3241 345/204 |
| 2004/0144978 | A2 * | 7/2004 | Koyama | H10K 59/12 257/59 |
| 2004/0189214 | A1 * | 9/2004 | Osame | H10K 19/10 315/169.3 |
| 2004/0256996 | A1 * | 12/2004 | Osame | G09G 3/3233 315/169.1 |
| 2004/0263506 | A1 * | 12/2004 | Koyama | G09G 3/3225 345/204 |
| 2004/0263741 | A1 * | 12/2004 | Koyama | G09G 3/3233 349/139 |
| 2005/0012686 | A1 * | 1/2005 | Osame | G09G 3/3233 257/E27.111 |
| 2006/0066252 | A1 * | 3/2006 | Kim | G09G 3/3233 315/169.3 |
| 2009/0140959 | A1 * | 6/2009 | Nam | G09G 3/325 345/76 |
| 2010/0001931 | A1 * | 1/2010 | Osame | H01L 33/0041 345/82 |
| 2019/0272785 | A1 * | 9/2019 | Qian | G09G 3/3208 |
| 2021/0027709 | A1 * | 1/2021 | Nishiyama | G09G 3/3233 |

* cited by examiner

SUBPIXEL CIRCUIT, DISPLAY PANEL, AND DISPLAY DEVICE

CROSS-REFERENCE TO RELATED APPLICATION

This application claims priority from Korean Patent Application No. 10-2021-0182406, filed on Dec. 20, 2021, which is hereby incorporated by reference for all purposes as if fully set forth herein.

BACKGROUND

1. Technical Field

Embodiments of the present disclosure relate to a subpixel circuit, a display panel, and a display device.

2. Description of Related Art

Representative display devices for displaying an image based on digital data include liquid crystal display (LCD) devices using liquid crystal and organic light emitting display devices using organic light emitting diodes (OLEDs).

Among these display devices, the organic light emitting displays adopt light emitting diodes and thus have fast responsiveness and various merits in contrast ratio, luminous efficiency, brightness, and viewing angle. In this case, the light emitting diode may be implemented with an inorganic material or an organic material.

An organic light emitting diode display includes light emitting diodes in subpixels arranged on the display panel and enables the light emitting diodes to emit light by controlling the current flowing to the light emitting diodes, thereby controlling the brightness represented by each subpixel while displaying an image.

Such a display device may have subpixel circuits disposed on the display panel to drive the light emitting elements. For example, the subpixel circuit includes a driving transistor for controlling a driving current flowing through the light emitting element, and at least one scan transistor for controlling a gate-source voltage of the driving transistor according to a scan signal. The scan transistor of the subpixel circuit may be controlled by the scan signal output from the gate driving circuit disposed on the substrate of the display panel.

In this case, characteristic values, such as the threshold voltage or mobility of the driving transistor constituting each subpixel, may vary according to the driving time, or a deviation in the characteristic value of each transistor may occur due to a difference in the driving time of each subpixel. A deviation in luminance between subpixels (luminance non-uniformity) may result, degrading image quality.

To address the deviation in luminance between subpixels, the display device may adopt techniques for sensing the characteristic values of the subpixel, such as the threshold voltage or mobility of the driving transistor, and for compensating for the same.

However, since the light emitting element constituting the subpixel may also deteriorate according to the use time of the display device, it is difficult to compensate for both the degradation of the light emitting element and the characteristic value(s) of the driving transistor.

SUMMARY

The inventors of the present disclosure have invented a subpixel circuit, a display panel, and a display device capable of compensating for both degradation of the driving transistor and degradation of the light emitting element. Accordingly, embodiments of the present disclosure are directed to a subpixel circuit, a display panel, and a display device that substantially obviate one or more problems due to limitations and disadvantages of the related art.

Embodiments of the present disclosure may provide a subpixel circuit, a display panel, and a display device capable of compensating for both degradation of the driving transistor and degradation of the light emitting element.

Embodiments of the present disclosure may provide a subpixel circuit, a display panel, and a display device capable of compensating for both degradation of the driving transistor and degradation of the light emitting element by controlling the driving current flowing through the light emitting element to be proportional to the data voltage.

Embodiments of the present disclosure may provide a subpixel circuit, a display panel, and a display device in which the driving current flowing through the light emitting element is controlled to be proportional to the data voltage regardless of a change in a characteristic value of the driving transistor.

Additional features and aspects will be set forth in part in the description which follows and in part will become apparent from the description or may be learned by practice of the inventive concepts provided herein. Other features and aspects of the inventive concepts may be realized and attained by the structure particularly pointed out in, or derivable from, the written description, the claims hereof, and the appended drawings.

To achieve these and other aspect of the inventive concepts, as embodied and broadly described herein, a subpixel circuit for operating at least one of a plurality of subpixels disposed on a display panel may include: a reference circuit configured to receive a high-potential voltage and to output a control voltage for controlling a driving current flowing through a light emitting element; a light emitting circuit including the light emitting element, the light emitting circuit being configured to receive the control voltage and a low-potential voltage and to control the light emitting element based on a driving voltage; an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal.

In another aspect, a display panel may include the subpixel circuit detailed above.

In yet another aspect, a display device may include: a display panel having a plurality of subpixels; a gate driving circuit configured to supply a plurality of scan signals to the display panel respectively through a plurality of gate lines; a data driving circuit configured to supply a plurality of data voltages to the display panel respectively through a plurality of data lines; and a timing controller configured to drive the gate driving circuit and the data driving circuit. Here, at least one of the subpixels may include: a reference circuit configured to receive a high-potential voltage and to output a control voltage for controlling a driving current flowing through a light emitting element; a light emitting circuit including the light emitting element, the light emitting circuit being configured to receive the control voltage and a low-potential voltage and to control the light emitting element based on a driving voltage; an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal.

According to embodiments of the present disclosure, there may be provided a subpixel circuit, a display panel, and a display device capable of compensating for both degradation of the driving transistor and degradation of the light emitting element.

According to embodiments of the present disclosure, there may be provided a subpixel circuit, a display panel, and a display device capable of compensating for both degradation of the driving transistor and degradation of the light emitting element by controlling the driving current flowing through the light emitting element to be proportional to the data voltage.

According to embodiments of the present disclosure, there may be provided a subpixel circuit, a display panel, and a display device in which the driving current flowing through the light emitting element is controlled to be proportional to the data voltage regardless of a change in a characteristic value of the driving transistor.

It is to be understood that both the foregoing general description and the following detailed description of the present disclosure are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
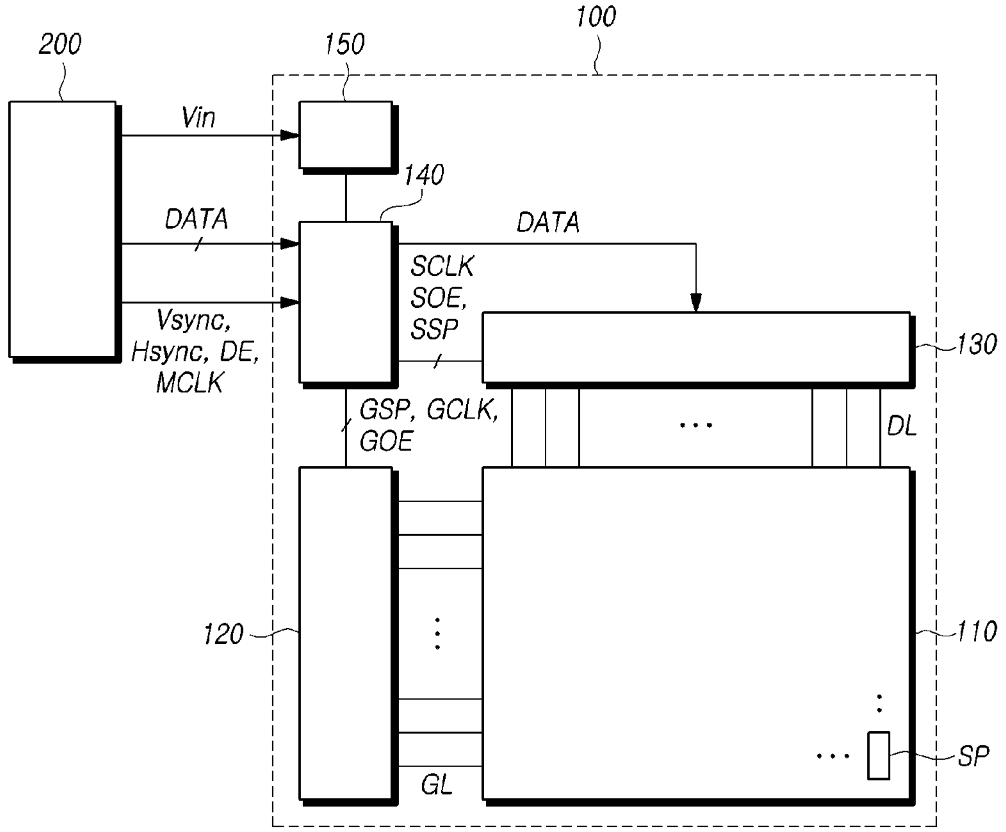
FIG. 1 is a diagram schematically illustrating a configuration of a display device according to various example embodiments of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

Like reference numerals designate like elements throughout, unless otherwise specified. Names of the respective elements used in the following explanations are selected only for convenience of writing the specification and may thus be different from those used in actual products.

In the following description, where a detailed description of relevant known function or configuration may unnecessarily obscure an aspect of example embodiments of the present disclosure, a detailed description of such known function of configuration may be omitted.

Where the terms “comprise,” “have,” “include,” “contain,” “constitute,” “made up of,” “formed of,” and the like are used, one or more other elements may be added unless the terms are used with a more limiting term, such as “only.” An element described in a singular form is intended to include plural forms, and vice versa, unless the context clearly indicates otherwise.

Although the terms “first,” “second,” A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

Where an expression that an element or layer “is connected to,” “is coupled to,” “is adhered to,” “contacts,” or “overlaps” another element or layer is used, the element or layer can not only be directly connected, coupled, or adhered to or directly contact or overlap another element or layer, but also be indirectly connected, coupled, or adhered or indirectly contact or overlap another element or layer with one or more intervening elements or layers “disposed,” or “interposed” between the elements or layers, unless otherwise specified.

Where a temporal relationship between processes, operations, flows, steps, events, or the like is described as, for example, “after,” “subsequent,” “next,” or “before,” the relationship encompasses not only a continuous or sequential order but also a non-continuous or non-sequential relationship unless a more limiting term, such as "just," "immediate(ly)," or "direct(ly)," is used.

The shapes, sizes, ratios, angles, numbers, and the like, which are illustrated in the drawings to describe various example embodiments of the present disclosure, are merely given by way of example. Therefore, the present disclosure is not limited to the illustrations in the drawings.

In construing an element, the element (including its dimensions and relative size) is to be construed as including an ordinary error or tolerance range even where no explicit description of such an error or tolerance range is provided. A tolerance or error range may be caused by various factors, such as process factors, internal or external impact, noise, and the like. Further, the term "may" fully encompasses all the meanings of the term "can."

Reference will now be made in detail to embodiments of the present disclosure, examples of which may be illustrated in the accompanying drawings.

FIG. 1 is a diagram schematically illustrating a configuration of a display device according to various example embodiments of the present disclosure.

As illustrated in FIG. 1, a display device 100 according to an example embodiment of the present disclosure may include a display panel 110 where a plurality of gate lines GL and data lines DL are connected, and a plurality of subpixels SP are arranged in a matrix form. The display device 100 may further include a gate driving circuit 120 for driving the plurality of gate lines GL, a data driving circuit 130 for supplying a data voltage through the plurality of data lines DL, a timing controller 140 for controlling the gate driving circuit 120 and the data driving circuit 130, and a power management circuit 150.

The display panel 110 may display an image based on a scan signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form. Each pixel may include subpixels SP having different colors, e.g., a white subpixel, a red subpixel, a green subpixel, and a blue subpixel. The subpixels SP may be defined respectively by the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, if the display device 100 having a resolution of 2,160×3,840 includes four subpixels SP of white (W), red (R), green (G), and blue (B), 3,840 data lines DL may respectively be connected to 2,160 gate lines GL and four subpixels WRGB. Thus, 3,840×4=15,360 data lines DL may be provided in the display device 100. Each subpixel SP may be disposed at the intersection between the corresponding gate line GL and the corresponding data line DL.

The gate driving circuit 120 may be controlled by the timing controller 140 to sequentially output scan signals to the plurality of gate lines GL disposed in the display panel 110, controlling the driving timing of the plurality of subpixels SP.

In the display device 100 having a resolution of, e.g., 2,160×3,840, sequentially outputting the scan signal to the 2,160 gate lines GL from the first gate line to the 2,160th gate line may be referred to as 2,160-phase driving operation. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving operation. In other words, sequentially outputting the scan signal to every N gate lines GL may be referred to as N-phase driving.

The gate driving circuit 120 may include one or more gate driving integrated circuits (GDICs). Depending on the driving schemes implemented, the gate driving circuit 120 may be positioned on only one side, or on each of two opposite sides, of the display panel 110. The gate driving circuit 120 may be implemented in a gate-in-panel (GIP) form and be embedded in the bezel area of the display panel 110.

The data driving circuit 130 may receive image data DATA from the timing controller 140 and convert the received image data DATA into an analog data voltage. Then, as the data voltage may be output to each data line DL according to the timing of the scan signal being applied to the corresponding gate line GL, each subpixel SP connected to the data line DL may display a light emitting signal having the brightness corresponding to the data voltage.

Likewise, the data driving circuit 130 may include one or more source driving integrated circuits SDIC. The source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type. In this case, each source driving integrated circuit SDIC may be mounted on a circuit film and may be electrically connected to the corresponding data lines DL of the display panel 110 through the circuit film.

The timing controller 140 may supply various control signals to the gate driving circuit 120 and the data driving circuit 130 and may control the operation of the gate driving circuit 120 and the data driving circuit 130. In other words, the timing controller 140 may control the gate driving circuit 120 to output a scan signal according to the timing implemented in each frame and, on the other hand, may transfer the image data DATA received from an external device (e.g., via a host system 200) to the data driving circuit 130.

In this case, the timing controller 140 may receive, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device, but the present disclosure is not limited thereto.

Accordingly, the timing controller 140 may generate a control signal according to various timing signals received from the host system 200 and may transfer the control signal to the gate driving circuit 120 and the data driving circuit 130.

For example, the timing controller 140 may output several gate control signals including, e.g., a gate start pulse GSP, a gate clock GCLK, and a gate output enable signal GOE, to control the gate driving circuit 120. The gate start pulse GSP may control the timing at which one or more gate driving integrated circuits GDIC constituting the gate driving circuit 120 start operation. The gate clock GCLK is a clock signal commonly input to one or more gate driving integrated circuits GDIC and may control the shift timing of the scan signal. The gate output enable signal GOE may designate timing information about one or more gate driving integrated circuits GDICs.

The timing controller 140 may output various data control signals including, e.g., a source start pulse SSP, a source sampling clock SCLK, and a source output enable signal SOE, to control the data driving circuit 130. The source start pulse SSP may control the timing at which one or more source driving integrated circuits SDIC constituting the data driving circuit 130 start data sampling. The source sampling clock SCLK is a clock signal that may control the timing of sampling data in the source driving integrated circuit(s) SDIC. The source output enable signal SOE may control the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 may adjust the direct current (DC) input voltage Vin supplied from the host system 200 to generate power required to drive the display panel 100, the gate driving circuit 120, and the data driving circuit 130.

A subpixel SP may be positioned at the intersection between the corresponding gate line GL and the corresponding data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as a liquid crystal display, an organic light emitting diode display, or a plasma display panel.

Figure 2:
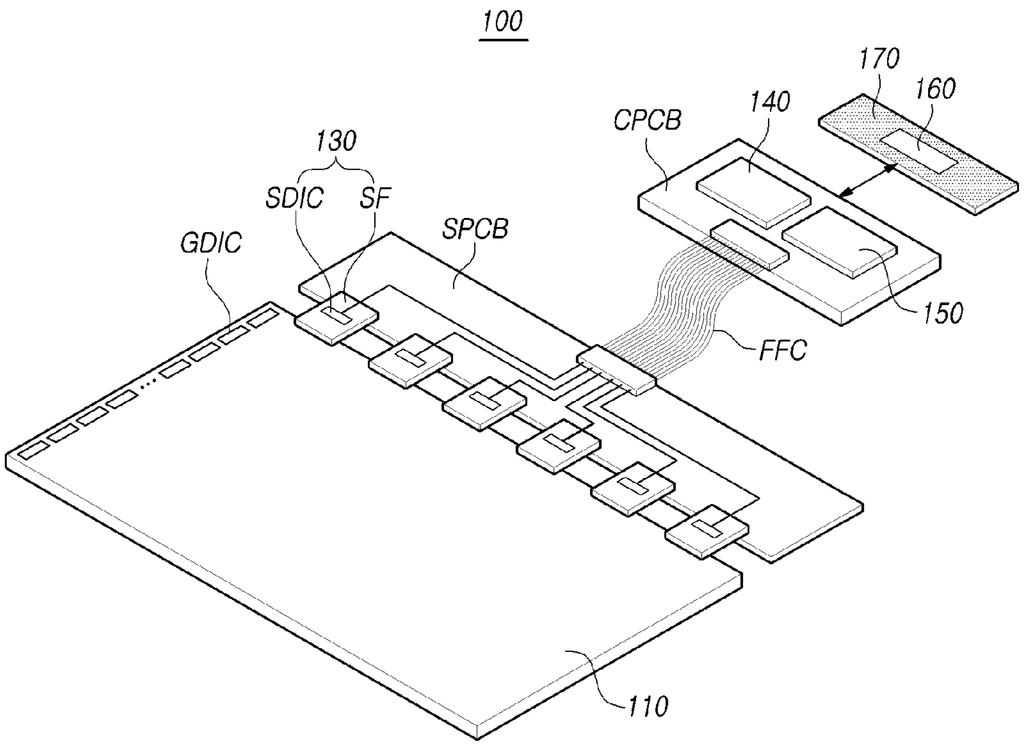
FIG. 2 is a view illustrating an example of a system of a display device according to example embodiments of the present disclosure.

FIG. 2 is a view illustrating an example of a system of a display device according to example embodiments of the present disclosure.

As illustrated in FIG. 2, in the display device 100 according to example embodiments of the present disclosure, the source driving integrated circuit(s) SDIC included in the data driving circuit 130 may be implemented in a chip-on-film (COF) type among various types (e.g., TAB, COG, or COF), and the gate driving circuit 120 may be implemented in a gate-in-panel (GIP) type among various types (e.g., TAB, COG, COF, or GIP).

Where the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock signal, a gate high signal, a gate low signal, etc.) for generating scan signals through gate driving-related signal lines disposed in the bezel area.

Likewise, one or more source driving integrated circuits SDIC included in the data driving circuit 130 each may be mounted on a source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and may include a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit (power management IC) 150 may be mounted on the control printed circuit board CPCB. The timing controller 140 may control the operation of the data driving circuit 130 and the gate driving circuit 120. The power management circuit 150 may supply power voltage or current to the display panel 110, the data driving circuit 130, and the gate driving circuit 120 and may control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit 160 for managing the overall power of the display device 100 may be disposed on the set board 170. The main power management circuit 160 may interwork with the power management circuit 150.

In the so-configured example display device 100, the power voltage may be generated in the set board 170 and be transferred to the power management circuit 150 in the control printed circuit board CPCB. The power management circuit 150 may transfer a power voltage for display driving or characteristic value sensing to the source printed circuit board SPCB through the flexible printed circuit FPC or flexible flat cable FFC. The power voltage transferred to the source printed circuit board SPCB may be supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the light emitting element, e.g., an organic light emitting diode.

The type and number of circuit elements constituting each subpixel SP may be varied depending on functions to be provided and design schemes.

Figure 3:
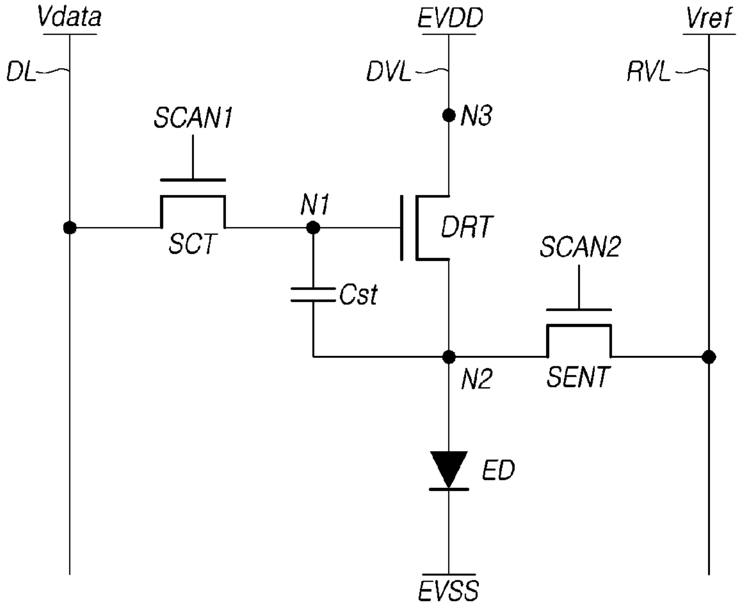
FIG. 3 is a diagram illustrating an example of a subpixel circuit of a display device.

FIG. 3 is a diagram illustrating an example of a subpixel circuit of a display device.

As illustrated in FIG. 3, an example subpixel circuit may include one or more transistors and a capacitor and may have a light emitting element disposed therein.

For example, the subpixel circuit may include a driving transistor DRT, a scan transistor SCT, a sensing transistor SENT, a storage capacitor Cst, and a light emitting diode ED.

The driving transistor DRT may include the first node N1, second node N2, and third node N3. The first node N1 of the driving transistor DRT may be a gate node to which the data voltage Vdata is applied from the data driving circuit 130 through the corresponding data line DL when the scan transistor SCT is turned on.

The second node N2 of the driving transistor DRT may be electrically connected with the anode electrode of the light emitting diode ED and may be one of the source node and drain node.

The third node N3 of the driving transistor DRT may be electrically connected with the driving voltage line DVL to which a high-potential voltage EVDD is applied and may be the other of the drain node and the source node.

In this case, during a display driving period, a high-potential voltage EVDD for displaying an image may be supplied to the driving voltage line DVL. For example, the high-potential voltage EVDD for displaying an image may be 27V.

The scan transistor SCT may be electrically connected between the first node N1 of the driving transistor DRT and the data line DL, and a corresponding gate line GL may be connected to the gate node of the scan transistor SCT. Thus, the scan transistor SCT may be operated according to the first scan signal SCAN1 supplied through the gate line GL. When turned on, the scan transistor SCT may transfer the data voltage Vdata supplied through the data line DL to the gate node (i.e., the first node N1) of the driving transistor DRT, thereby controlling the operation of the driving transistor DRT.

The sensing transistor SENT may be electrically connected between the second node N2 of the driving transistor DRT and the reference voltage line RVL, and a corresponding gate line GL may be connected to the gate node of the sensing transistor SENT. The sensing transistor SENT may be operated according to the second scan signal SCAN2 supplied through this gate line GL. When the sensing transistor SENT is turned on, a reference voltage Vref supplied through the reference voltage line RVL may be transferred to the second node N2 of the driving transistor DRT.

In other words, as the scan transistor SCT and the sensing transistor SENT are controlled, the voltage of the first node N1 and the voltage of the second node N2 of the driving transistor DRT may be controlled, so that the current for driving the light emitting diode ED may be supplied.

The gate nodes of the scan transistor SCT and the sensing transistor SENT may be commonly connected to one gate line GL or may be connected to different gate lines GL. An example is shown in which the scan transistor SCT and the sensing transistor SENT are connected to different gate lines GL. In this example case, the scan transistor SCT and the sensing transistor SENT may be independently controlled, respectively, by the first scan signal SCAN1 and the second scan signal SCAN2 transferred through different gate lines GL.

On the other hand, if the scan transistor SCT and the sensing transistor SENT are connected commonly to one gate line GL, the scan transistor SCT and the sensing transistor SENT may be simultaneously controlled by the first scan signal SCAN1 or by the second scan signal SCAN2 transferred through one gate line GL, and the aperture ratio of the subpixel SP may increase.

Each transistor disposed in the subpixel circuit may be an N-type transistor or a P-type transistor. In the example shown in FIG. 3, the transistors are N-type transistors.

The storage capacitor Cst may be electrically connected between the first node N1 and second node N2 of the driving transistor DRT and may maintain the data voltage Vdata during one frame.

The storage capacitor Cst may also be connected between the first node N1 and third node N3 of the driving transistor DRT depending on the type of the driving transistor DRT. The anode electrode of the light emitting diode ED may be electrically connected with the second node N2 of the driving transistor DRT, and a low-potential voltage EVSS may be applied to the cathode electrode of the light emitting diode ED.

The low-potential voltage EVSS may be a ground voltage or a voltage higher or lower than the ground voltage. The low-potential voltage EVSS may be varied depending on the driving state. For example, the low-potential voltage EVSS at the time of display driving and the low-potential voltage EVSS at the time of sensing driving may be set to differ from each other.

The scan transistor SCT and the sensing transistor SENT may be referred to as scan transistors controlled through scan signals SCAN1 and SCAN2, respectively.

The structure of the subpixel SP may further include one or more additional transistors or, in some cases, further include one or more additional capacitors.

In this case, to effectively sense a characteristic value, e.g., a threshold voltage or mobility, of the driving transistor DRT, the display device 100 may use a method for measuring the current flow by the voltage charged to the storage capacitor Cst during a characteristic value sensing period of the driving transistor DRT. This is referred to as current sensing.

In other words, it is possible to figure out the characteristic value, or a variation in characteristic value, of the driving transistor DRT in the subpixel SP by measuring the current flow by the voltage charged to the storage capacitor Cst during the characteristic value sensing period of the driving transistor DRT.

In this case, the reference voltage line RVL may serve not only to transfer the reference voltage Vref but also as a sensing line for sensing the characteristic value of the driving transistor DRT in the subpixel. Thus, the reference voltage line RVL may also be referred to as a sensing line or a sensing channel.

More specifically, the characteristic value or a change in the characteristic value of the driving transistor DRT may correspond to a difference between the gate node voltage and the source node voltage of the driving transistor DRT.

The compensation for the characteristic value of the driving transistor DRT may be performed by external compensation that senses and compensates for the characteristic value of the driving transistor DRT using an external compensation circuit. Alternatively, the compensation may be performed by internal compensation that senses and compensates for the characteristic value of the driving transistor DRT inside the subpixel SP, rather than using an additional external configuration.

In this case, the external compensation may be performed before the display device 100 is shipped out, and the internal compensation may be performed after the display device 100 is shipped out. However, internal compensation and external compensation may be performed together even after the display device 100 is shipped out.

Figure 4:
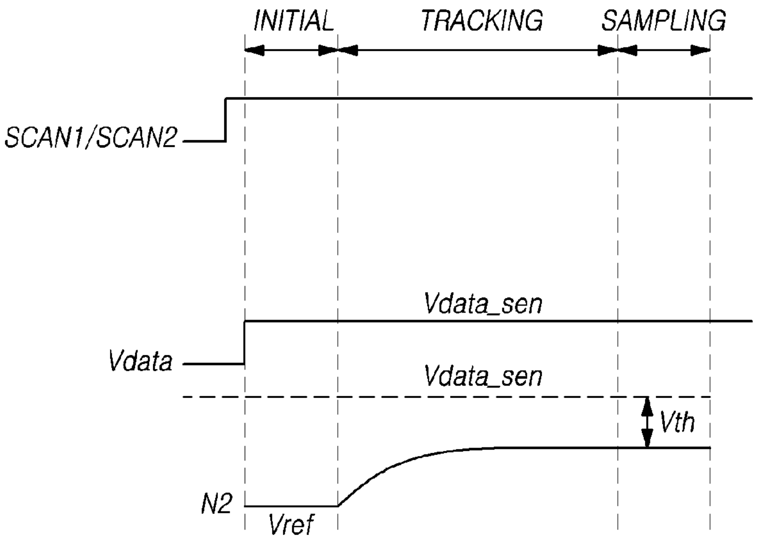
FIG. 4 is a signal timing diagram illustrating an example of external compensation for a threshold voltage of a driving transistor in a display device.

FIG. 4 is a signal timing diagram illustrating an example of external compensation for a threshold voltage of a driving transistor in a display device.

As shown in FIG. 4, the sensing of the threshold voltage Vth of the driving transistor DRT in the example display device 100 may be performed in an initialization phase INITIAL, a tracking phase TRACKING, and a sampling phase SAMPLING.

In this case, since the scan transistor SCT and the sensing transistor SENT are simultaneously turned on and turned off for sensing the threshold voltage Vth of the driving transistor DRT, the first scan signal SCAN1 and the second scan signal SCAN2 together may be applied through one gate line GL, or the first scan signal SCAN1 and the second scan signal SCAN2 may respectively be applied at the same time through different gate lines GL.

The initialization phase INITIAL is a period in which the second node N2 of the driving transistor DRT may be charged with the reference voltage Vref for sensing the threshold voltage Vth of the driving transistor DRT, and the first scan signal SCAN1 and the second scan signal SCAN2 which have high levels may be applied through the gate line(s) GL.

The tracking phase TRACKING is a period in which charges may be stored in the storage capacitor Cst after the charging of the second node N2 of the driving transistor DRT is completed.

The sampling phase SAMPLING is a period in which a current flow from the charge stored in the storage capacitor Cst is detected after the storage capacitor Cst of the driving transistor DRT is charged.

If the first scan signal SCAN1 and the second scan signal SCAN2 at the turn-on level are simultaneously applied in the initialization phase INITIAL, the scan transistor SCT may be turned on. Accordingly, the first node N1 of the driving transistor DRT may be initialized to the sensing data voltage Vdata_sen for sensing the threshold voltage Vth.

The sensing transistor SENT may also be turned on by the first scan signal SCAN1 and the second scan signal SCAN2 at the turn-on level, and the reference voltage Vref may be applied through the reference voltage line RVL. Thus, the second node N2 of the driving transistor DRT may be initialized to the reference voltage Vref.

In the tracking phase TRACKING, the voltage of the second node N2 of the driving transistor DRT reflecting the threshold voltage Vth of the driving transistor DRT may be tracked. To this end, in the tracking phase TRACKING, the scan transistor SCT and the sensing transistor SENT may remain in the turned-on state, and the reference voltage Vref applied through the reference voltage line RVL may be cut off.

Accordingly, the second node N2 of the driving transistor DRT may float, and the voltage at the second node N2 of the driving transistor DRT may start to rise from the reference voltage Vref. In this case, since the sensing transistor SENT is on, the increase in the voltage at the second node N2 of the driving transistor DRT may lead to an increase in the voltage on the reference voltage line RVL.

In this process, the voltage at the second node N2 of the driving transistor DRT may be increased and then saturated. The saturation voltage at the time when the second node N2 of the driving transistor DRT reaches the saturated state may correspond to the difference (Vdata_sen−Vth) between the sensing data voltage Vdata_sen for sensing the threshold voltage Vth and the threshold voltage Vth of the driving transistor DRT.

In the sampling phase SAMPLING, the high-level first scan signal SCAN1 and second scan signal SCAN2 to the gate line(s) GL may be maintained, and the charge stored in the storage capacitor Cst of the driving transistor DRT may be sensed by the characteristic value sensing circuit included in the data driving circuit 130.

Figure 5:
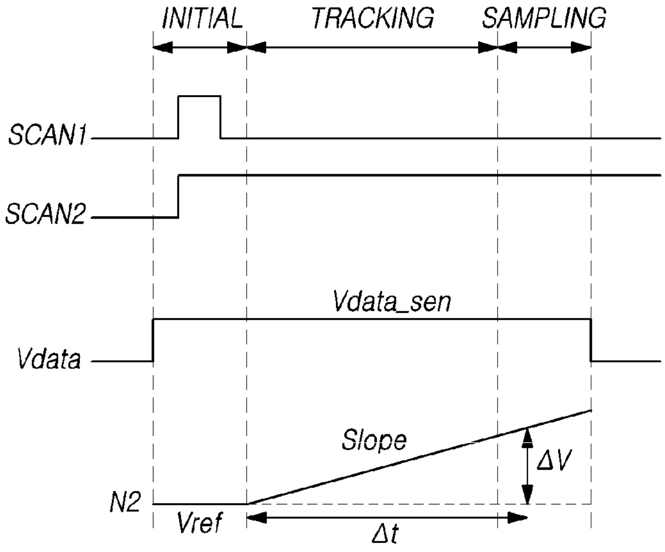
FIG. 5 is a signal timing diagram illustrating an example of external compensation for a mobility of a driving transistor in a display device.

FIG. 5 is a signal timing diagram illustrating an example of external compensation for a mobility of a driving transistor in a display device.

As shown in FIG. 5, like the sensing of the threshold voltage Vth, the sensing of the mobility of the driving transistor DRT in the example display device 100 may be performed in an initialization phase INITIAL, a tracking phase TRACKING, and a sampling phase SAMPLING.

In the initialization phase INITIAL, the scan transistor SCT may be turned on by the first scan signal SCAN1 at the turn-on level, so that the first node N1 of the driving transistor DRT may be initialized to the data voltage Vdata_sen for mobility sensing. Further, the sensing transistor SENT may be turned on by the second scan signal SCAN2 at the turn-on level and, in this state, the second node N2 of the driving transistor DRT may be initialized to the reference voltage Vref.

The tracking phase TRACKING is a phase for tracking the mobility of the driving transistor DRT. The mobility of the driving transistor DRT may indicate the current driving capability of the driving transistor DRT, and the mobility of the driving transistor DRT may be calculated by tracking the voltage at the second node N2 of the driving transistor DRT through the tracking phase TRACKING.

In the tracking phase TRACKING, the scan transistor SCT may be turned off by the first scan signal SCAN1 at the turn-off level, and the switch through which the reference voltage Vref is applied to the reference voltage line RVL may be cut off. Accordingly, both the first node N1 and the second node N2 of the driving transistor DRT may float, and the voltages at the first node N1 and the second node N2 of the driving transistor DRT may both increase.

In particular, since the voltage at the second node N2 of the driving transistor DRT may be initialized to the reference voltage Vref, it may start to increase from the reference voltage Vref. In this case, since the sensing transistor SENT is on, the increase in the voltage at the second node N2 of the driving transistor DRT may lead to an increase in the voltage on the reference voltage line RVL.

In the sampling phase SAMPLING, the characteristic value sensing circuit may detect the voltage of the second node N2 of the driving transistor DRT, a predetermined amount of time Δt after the voltage at the second node N2 starts to increase.

In this case, the sensing voltage detected by the characteristic value sensing circuit may indicate a voltage Vref+ΔV, which is the reference voltage Vref plus a predetermined voltage ΔV. The mobility of the driving transistor DRT may be calculated based on the so-detected sensing voltage Vref+ΔV, the reference voltage Vref which is already known, and the amount of time Δt for the voltage at the second node N2 to increase by ΔV.

In other words, the mobility of the driving transistor DRT is proportional to the voltage variation ΔV/Δt per unit time on the reference voltage line RVL through the tracking phase TRACKING and the sampling phase SAMPLING. Accordingly, the mobility of the driving transistor DRT may be proportional to the slope of the voltage waveform on the reference voltage line RVL.

Figure 6:
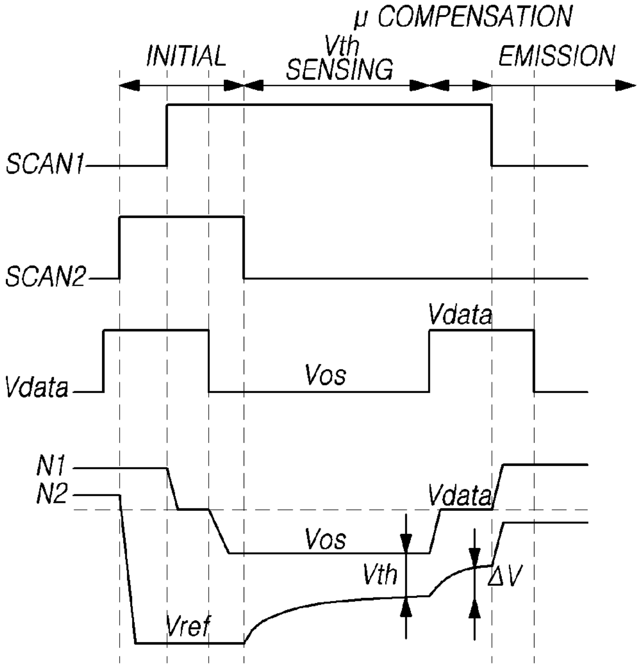
FIG. 6 is a signal timing diagram illustrating an example of internal compensation for a threshold voltage and mobility of a driving transistor in a display device.

FIG. 6 is a signal timing diagram illustrating an example of internal compensation for a threshold voltage and mobility of a driving transistor in a display device.

As shown in FIG. 6, the internal compensation for the characteristic value of the driving transistor DRT in the display device 100 may proceed in an initialization phase INITIAL, a threshold voltage sensing phase Vth SENSING, a mobility compensation phase μ COMPENSATION, and a light emission phase EMISSION.

In the initialization phase INITIAL, a high-level second scan signal SCAN2 may be input to turn on the sensing transistor SENT, thereby initializing the voltage at the second node N2, that is, the source node voltage of the driving transistor DRT, to a reference voltage Vref.

Thereafter, the high-level first scan signal SCAN1 may be supplied to turn on the scan transistor SCT, and the data voltage Vdata may be supplied to the first node N1, i.e., the gate node of the driving transistor DRT, to turn on the driving transistor DRT. Subsequently, if the data voltage Vdata is lowered to the level of the offset voltage Vos, the voltage of the first node N1 may become the level of the offset voltage Vos.

If the low-level second scan signal SCAN2 is applied to turn off the sensing transistor SENT in the threshold voltage sensing phase Vth SENSING, the voltage of the second node N2 may rise to the voltage of the difference between the offset voltage Vos and the threshold voltage Vth of the driving transistor DRT through the driving transistor DRT, so that the storage capacitor Cst is charged with the voltage of the threshold voltage Vth level.

In the mobility compensating phase μ COMPENSATION, the voltage of the first node N1 may be raised to the level of the data voltage Vdata by applying the grayscale to be displayed through the display panel 110, that is, the corresponding data voltage Vdata. Accordingly, the second node N2 may be gradually charged according to the mobility (μ) characteristic of the driving transistor DRT. As a result, the storage capacitor Cst may store the difference voltage which is the sum of the data voltage Vdata and the threshold voltage Vth minus the voltage variation ΔV according to the offset voltage Vos and the mobility μ.

In the light emission phase EMISSION, a low-level first scan signal SCAN1 may be applied to turn off the scan transistor SCT, so that the driving transistor DRT applies the current where the threshold voltage Vth and mobility μ have been corrected to the light emitting diode EL by the voltage level stored in the storage capacitor Cst.

Such internal compensation or external compensation may be performed after a power-on signal is generated in the display device 100 and before display driving starts. For example, if a power-on signal is applied to the display device 100, the timing controller 140 may load various parameters for driving the display panel 110 and then may drive the display.

In this case, the parameters for driving the display panel 110 may include information about the sensing and compensation for characteristic values previously performed on the display panel 110. In the parameter loading process, the sensing and compensation of characteristic values (the threshold voltage and mobility) of the driving transistor DRT may be performed. As described above, a process in which the characteristic value is sensed in the parameter loading process after the power-on signal is generated may be referred to as an on-sensing process.

Alternatively, a period in which the characteristic value(s) of the driving transistor DRT are sensed and compensated for may proceed after a power-off signal of the display device 100 is generated. For example, when a power-off signal is generated in the display device 100, the timing controller 140 may cut off the data voltage Vdata supplied to the display panel 110 and may sense the characteristic value(s) of the driving transistor DRT for a predetermined time. As such, a sensing process for sensing a characteristic value in a state in which the data voltage is cut off as a power-off signal is generated may be referred to as an off-sensing process.

Further, the sensing and compensation for the characteristic value(s) of the driving transistor DRT may be performed in real time while the display is driven. This sensing process is referred to as a real-time (RT) sensing process. In the real-time sensing process, the sensing process may be performed on one or more subpixels SP in one or more subpixel SP lines, in each blank period during the display driving period.

In other words, during the display driving period when an image is displayed on the display panel 110, a blank period in which the data voltage is not supplied to the subpixel SP may exist within one frame or between one frame and the next frame. In the blank period, characteristic value sensing and compensation for one or more subpixels SP may be performed.

As such, when the sensing process is performed in the blank period, the line(s) of subpixels SP on which the sensing process is performed may be randomly selected. Accordingly, after the sensing process in the blank period is performed, an abnormality that may appear in the display driving period may be alleviated. During the display driving period after the sensing process is performed during the blank period, a recovery data voltage may be supplied to the subpixels SP where the sensing process has been performed. Accordingly, in the display driving period after the sensing process in the blank period, abnormalities in the line(s) of subpixel SP where the sensing process has been completed may be further alleviated.

In this case, since the threshold voltage sensing of the driving transistor DRT may take a long time as saturation of the voltage at the second node N2 of the driving transistor DRT may take a relatively long time, the sensing and compensation of the threshold voltage Vth may be performed primarily as an off-sensing process. In contrast, since the mobility sensing of the driving transistor DRT may take a relatively short time as compared to the threshold voltage sensing process, the mobility sensing and compensation may be performed as a real-time sensing process.

However, in the display device 100, the light emitting element ED constituting the subpixel may also deteriorate according to the driving time. The above-described internal compensation and external compensation may not compensate for both the deterioration of the light emitting element ED and the characteristic value(s) of the driving transistor DRT.

Accordingly, embodiments of the present disclosure provide a subpixel circuit, a display panel, and a display device, capable of compensating for both the deterioration of the light emitting element ED and the deterioration of the driving transistor DRT by presenting a new subpixel circuit controlled so that the driving current flowing through the light emitting element ED may be proportional to the data voltage Vdata.

As a result, there may be provided a subpixel circuit, a display panel, and a display device which may maintain the driving current flowing through the light emitting element ED constant although the characteristic value(s) of the driving transistor DRT are varied.

Figure 7:
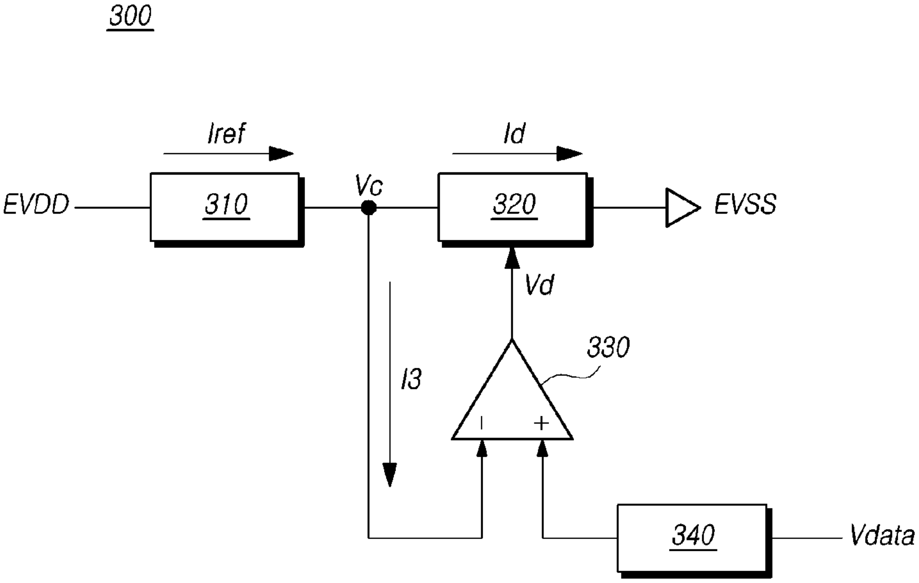
FIG. 7 is a block diagram illustrating a subpixel circuit according to example embodiments of the present disclosure.

FIG. 7 is a block diagram illustrating a subpixel circuit according to example embodiments of the present disclosure.

As shown in FIG. 7, a subpixel circuit 300 according to example embodiments of the present disclosure may include a reference circuit 310, a light emitting circuit 320, an amplification circuit 330, and an input circuit 340.

The reference circuit 310 may receive the high-potential voltage EVDD and may control variations in the driving current Id flowing through the light emitting circuit 320. For example, when the control voltage Vc at the input node of the light emitting circuit 320 and the data voltage Vdata have the same potential, the current I3 applied to the amplification circuit 330 becomes 0 so that the reference current Iref flowing through the reference circuit 310 and the driving current Id flowing through the light emitting circuit 320 have the same value.

The high-potential voltage EVDD may have a level required to display an image during the display driving period. For example, the high-potential voltage EVDD to display an image may be 27V, but the present disclosure is not limited thereto.

The light emitting circuit 320 may be positioned between the control voltage Vc and the low-potential voltage EVSS and may control the operation of the light emitting element ED according to the driving voltage Vd at the output node of the amplification circuit 330. When the light emitting element ED is turned on, the driving current Id may flow through the light emitting circuit 320.

The low-potential voltage EVSS may be a ground voltage or a voltage higher or lower than the ground voltage. The low-potential voltage EVSS may be varied depending on the driving state. For example, the low-potential voltage EVSS at the time of display driving and the low-potential voltage EVSS at the time of sensing driving may be set to differ from each other.

The amplification circuit 330 may compare the control voltage Vc and the data voltage Vdata to generate a driving voltage Vd for controlling the operation of the light emitting circuit 320. For example, the amplification circuit 330 may be formed of an operational amplifier that has an inverting input terminal to which the control voltage Vc is applied and a non-inverting input terminal (+) to which the output voltage from the input circuit 340 is applied.

The resistance value of the light emitting circuit 320 may be reduced in inverse proportion to the driving voltage Vd of the amplification circuit 330. When the control voltage Vc is larger than the data voltage Vdata, the driving voltage Vd corresponding to the output node of the amplification circuit 330 may be reduced.

Accordingly, when the control voltage Vc and the data voltage Vdata have the same level, the operation of the amplification circuit 330 may be stopped, and the control voltage Vc may remain at the same level as the data voltage Vdata.

The input circuit 340 may determine the time when the data voltage Vdata is applied to the non-inverting input terminal (+) of the amplification circuit 330 by the scan signal SCAN.

In other words, the example subpixel circuit 300 of the present disclosure may be controlled to allow the control voltage Vc to remain at the level proportional to the data voltage Vdata, so that the driving current Id flowing through the light emitting element ED is proportional to the level of the data voltage Vdata. As a result, regardless of degradation of the light emitting element ED or the characteristic value (s) of the driving transistor, a current proportional to the data voltage Vdata may flow through the light emitting element ED, keeping the luminance of the display device 100 constant.

Figure 8:
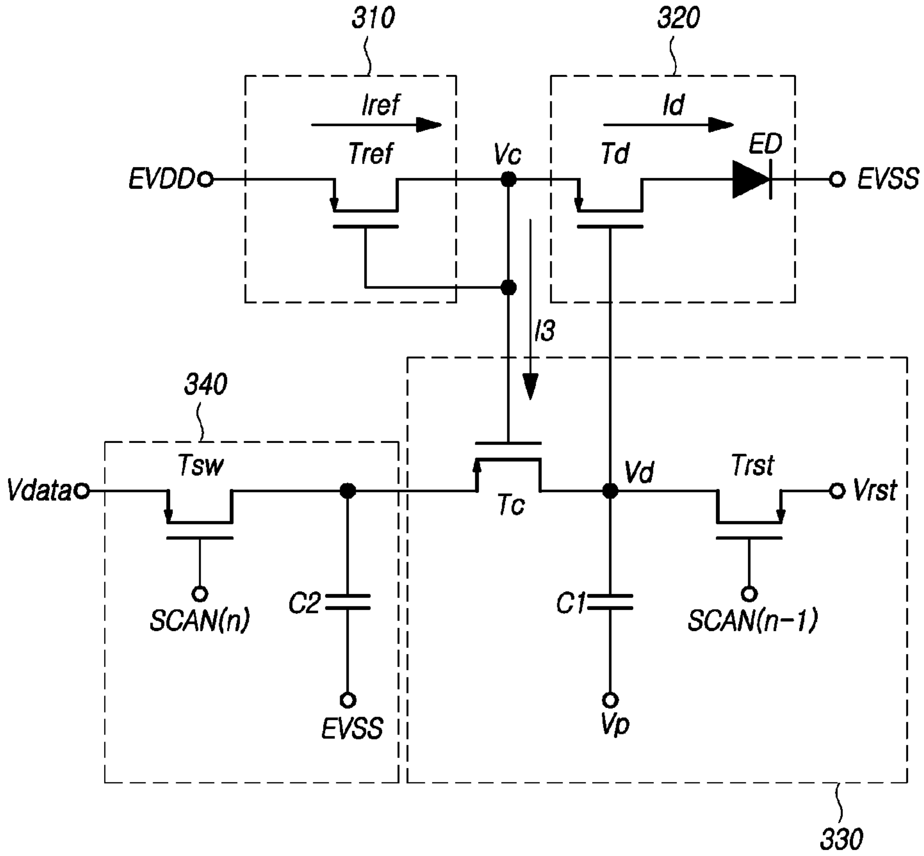
FIG. 8 is a diagram illustrating a detailed configuration of a subpixel circuit according to example embodiments of the present disclosure.

FIG. 8 is a diagram illustrating a detailed configuration of a subpixel circuit according to example embodiments of the present disclosure.

As shown in FIG. 8, a subpixel circuit 300 according to example embodiments of the present disclosure may include a reference circuit 310, a light emitting circuit 320, an amplification circuit 330, and an input circuit 340. Described below is the example subpixel circuit 300 to which the n-th scan signal SCAN(n) is applied among the plurality of subpixels constituting the display panel 110, for example.

The reference circuit 310 may include a reference transistor Tref having a drain node and a gate node, at which the control voltage Vc may be provided, and a source node to which a high-potential voltage EVDD may be applied.

The light emitting circuit 320 may include a light emitting element ED having a cathode electrode, to which a low-potential voltage EVSS may be applied, and a driving transistor Td having a drain node connected to the anode electrode of the light emitting element ED, a source node to which the control voltage Vc may be applied, and a gate node to which the driving voltage Vd of the amplification circuit 330 may be applied.

The reference transistor Tref may be turned on while the high-potential voltage EVDD is applied to the source node and, when the driving transistor Td is turned on by the driving voltage Vd of the amplification circuit 330, the driving current Id may flow through the light emitting circuit 320.

In this case, when the control voltage Vc and the data voltage Vdata have the same level of potential, the entire reference current Iref flowing through the reference circuit 310 may flow through the light emitting circuit 320, and the driving current Id may have the same value as the reference current Iref.

The amplification circuit 330 may include a control transistor Tc, a reset transistor Trst, and a first capacitor C1. The control transistor Tc may have a gate node, to which the control voltage Vc may be applied, and a drain node connected to the gate node of the driving transistor Td. The reset transistor Trst may have a source node to receive a reset voltage Vrst, a gate node to which the (n−1)-th scan signal SCAN(n−1) may be applied, and a drain node shared with the control transistor Tc. The first capacitor C1 may be connected to the drain node of the control transistor Tc to transfer a power voltage Vp for driving the driving transistor Td.

The reset voltage Vrst may be applied at a voltage level configured to turn off the driving transistor Td.

The power voltage Vp may be applied at a level capable of driving the driving transistor Td at a certain point in time, and the level may be changed by the charge stored in the first capacitor C1. In other words, the power voltage Vp may not continuously maintain a constant level of voltage.

The input circuit 340 may include a switching transistor Tsw and a second capacitor C2. The switching transistor Tsw may have a gate node to which the n-th scan signal SCAN(n) may be applied, a source node to which the data voltage Vdata may be applied, and a drain node connected to the source node of the control transistor Tc. The second capacitor C2 may be connected between the drain node of the switching transistor Tsw and the low-potential voltage EVSS.

Accordingly, the input circuit 340 may supply the data voltage Vdata to the amplification circuit 330 by the n-th scan signal SCAN(n). The second capacitor C2 may serve to stably transfer the data voltage Vdata.

The transistors Td, Tref, Tc, Trst, and Tsw constituting the example subpixel circuit 300 may be P-type transistors or N-type transistors.

The P-type transistor is relatively more reliable than the N-type transistor. In the case of the P-type transistor, since the driving transistor Td may be fixed to the high-potential voltage EVDD during the period when the light emitting element ED emits light, the current flowing through the light emitting element ED may be supplied stably without significant fluctuation.

When operating in the saturation area, the P-type transistor may flow a constant current regardless of a change in the threshold voltage, providing relatively high reliability.

On the other hand, since the N-type transistor uses electrons, not holes, as carriers, it has higher mobility than the P-type transistor so that the switching speed may be increased.

The N-type transistor may be an oxide transistor formed of an oxide semiconductor (e.g., a transistor having a channel formed from an oxide semiconductor, such as indium, gallium, zinc oxide, or IGZO). The P-type transistor may be a silicon transistor formed from a semiconductor, such as silicon (e.g., a transistor having a polysilicon channel formed by a low temperature process referred to as LTPS or low temperature polysilicon).

Described here is an example in which the transistors Td, Tref, Tc, Trst, and Tsw constituting the subpixel circuit 300 are P-type transistors.

The terms "source node" and "drain node" for the transistors may be interchangeably used depending on the input voltage.

Figure 9:
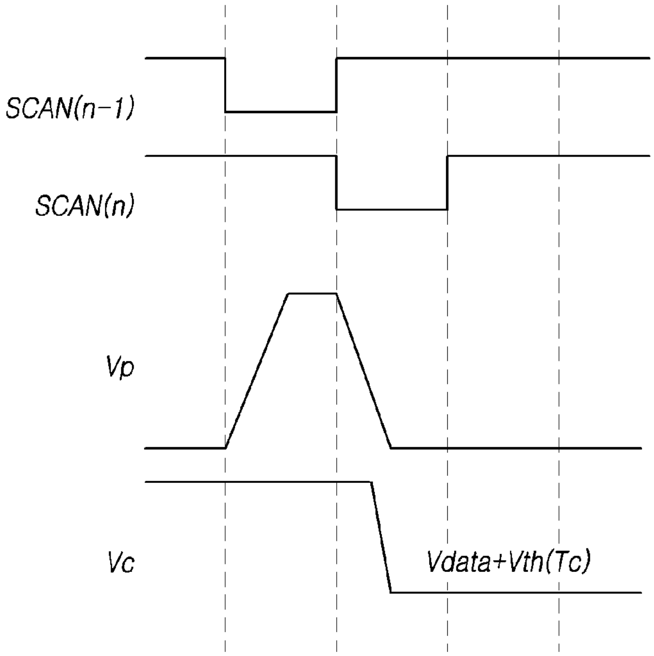
FIG. 9 is an example signal waveform view illustrating operations of a subpixel circuit according to example embodiments of the present disclosure.

FIG. 9 is an example signal waveform view illustrating operations of a subpixel circuit according to example embodiments of the present disclosure.

With reference to FIG. 9, an operation for the subpixel circuit 300 driven by the n-th scan signal SCAN(n) in the display device 100 according to example embodiments of the present disclosure is described below.

If the reset transistor Trst is turned on by the (n−1)-th scan signal SCAN(n−1) prior to the n-th scan signal SCAN(n), the reset voltage Vrst may be applied to the gate node of the driving transistor Td to turn off the driving transistor Td. The power voltage Vp may increase to the level of the reset voltage Vrst.

Thereafter, if the n-th scan signal SCAN(n) is applied to turn on the switching transistor Tsw, the data voltage Vdata may be applied to the second capacitor C2. In this case, the power voltage Vp may decrease with a constant slope. If the power voltage Vp reaches the threshold voltage level of the driving transistor Td, the driving transistor Td may be turned on, and the reference current Iref flowing through the reference circuit 310 may be transferred to the light emitting circuit 320 through the driving transistor Td.

The control voltage Vc corresponding to the output voltage of the reference circuit 310 may be decreased by the reference current Iref and the driving current Id flowing from the reference circuit 310 through the light emitting circuit 320.

If the control voltage Vc decreases and reaches the sum Vdata+Vth(Tc) of the data voltage Vdata and the threshold voltage Vth(Tc) of the control transistor Tc, the control transistor Tc may be turned on. If the control transistor Tc is turned on, charges stored in the first capacitor C1 may move to the second capacitor C2, so that the driving current Id flowing through the driving transistor Td may decrease. Accordingly, the control voltage Vc may increase, and the control transistor Tc may be turned off.

As the control transistor Tc repeats being turned on and off for short periods of time, the control voltage Vc may maintain the level of the sum Vdata+Vth(Tc) of the data voltage Vdata and the threshold voltage Vth(Tc) of the control transistor Tc.

In this state, the reference current Iref flowing through the reference transistor Tref may be expressed as follows in the saturation area:

$$Iref=K*[(Vc-Vth(Tref)]^2=K*[(Vdata+Vth(Tc)-Vth(Tref)]^2$$

Here, K=Cox*(W/L)*μ, W and L, respectively, denote the channel width and length of the reference transistor Tref, Cox denotes the capacitance of the gate insulation film, and μ denotes the mobility of the reference transistor Tref.

In this case, if the deposition conditions for the control transistor Tc and the reference transistor Tref positioned adjacent to each other are maintained the same, the threshold voltage Vth(Tc) of the control transistor Tc and the threshold voltage Vth(Tref) of the reference transistor Tref may have the same value. In other words, the control transistor Tc and the reference transistor Tref may be formed to have the same threshold voltage Vth by maintaining the thickness and composition ratio of the gate node, the source node, the drain node, and the insulation film positioned between them under the same conditions in the process of depositing the control transistor Tc and the reference transistor Tref.

If the threshold voltage Vth(Tc) of the control transistor Tc and the threshold voltage Vth(Tref) of the reference transistor Tref have the same value, the reference current Iref flowing through the reference transistor Tref may be expressed as:

$$Iref=K*Vdata^2$$

In other words, as the driving current Id flowing through the light emitting element ED and the reference current Iref flowing through the reference transistor Tref are each proportional to the data voltage Vdata, the driving current Id for driving the light emitting element ED may be adjusted by the data voltage Vdata regardless of the characteristics of the light emitting element ED or the characteristic values of the driving transistor Td.

On the other hand, if the driving transistor Td is an oxide transistor, the threshold voltage Vth may be shifted by positive bias temperature stress (PBTS). But in this case, it is possible to minimize changes in threshold voltage Vth by increasing the magnitude of the high-potential voltage EVDD to increase the driving current Id flowing through the light emitting element ED and decreasing the gate-source node voltage of the driving transistor Td.

For example, the high-potential voltage EVDD may be set to 28V or higher to reduce the shift of the threshold voltage Vth of the driving transistor Td due to positive bias temperature stress (PBTS).

As a result, the example subpixel circuit 300 of the present disclosure may control to allow the driving current Id flowing through the light emitting element ED to be proportional to the level of the data voltage Vdata by allowing the control voltage Vc corresponding to the output voltage of the reference circuit 310 to remain at the level corresponding to the sum Vdata+Vth(Tc) of the threshold voltage Vth(Tc) of the control transistor Tc and the data voltage Vdata. Accordingly, in the example subpixel circuit 300 of the present disclosure, a current proportional to the data voltage Vdata may flow through the light emitting element ED regardless of deterioration of the light emitting element ED or the characteristic value of the driving transistor Td. Thus, there may be provided a display panel 110 and a display device 100 having uniform luminance.

Figure 10:
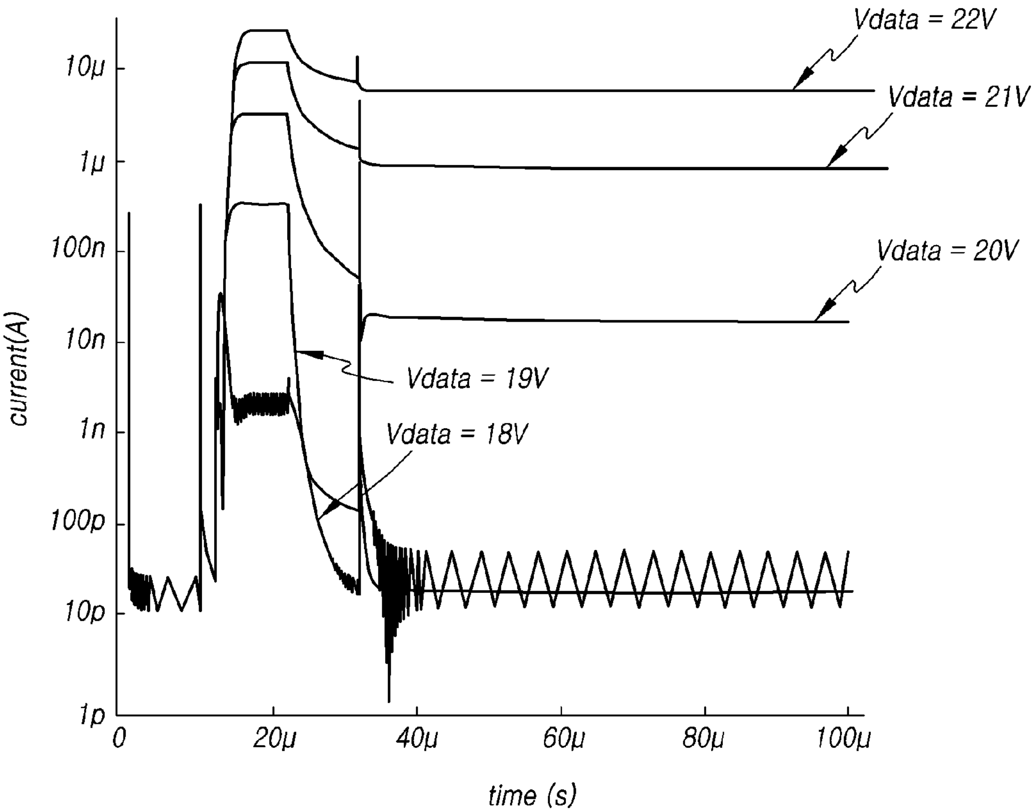
FIG. 10 is a signal waveform view illustrating a variation in a current flowing through a reference circuit depending on a data voltage in a subpixel circuit according to example embodiments of the present disclosure.

FIG. 10 is a signal waveform view illustrating a variation in a current flowing through a reference circuit depending on a data voltage in a subpixel circuit according to example embodiments of the present disclosure.

As illustrated in FIG. 10, the subpixel circuit 300 according to example embodiments of the present disclosure may be controlled so that the driving current Id flowing through the light emitting circuit 320 and the reference current Iref flowing through the reference circuit 310 to be proportional to the level of the data voltage Vdata by allowing the control voltage Vc at the output node of the reference circuit 310 to remain at the level corresponding to the sum Vdata+Vth(Tc) of the threshold voltage Vth(Tc) of the control transistor Tc and the data voltage Vdata.

For example, as the control voltage Vc remains at the level corresponding to the sum Vdata+Vth(Tc) of the threshold voltage Vth(Tc) of the control transistor Tc and the data voltage Vdata, the driving current Id flowing through the light emitting circuit 320 and the reference current Iref flowing through the reference circuit 310 may maintain the same value. In this case, it may be identified that, when the data voltage Vdata is sequentially changed to the levels of 22V, 21V 20V 19V, and 18V, the driving current Id flowing through the light emitting circuit 320 and the reference current Iref flowing through the reference circuit 310 each have a value substantially proportional to the data voltage Vdata.

Figure 11A:
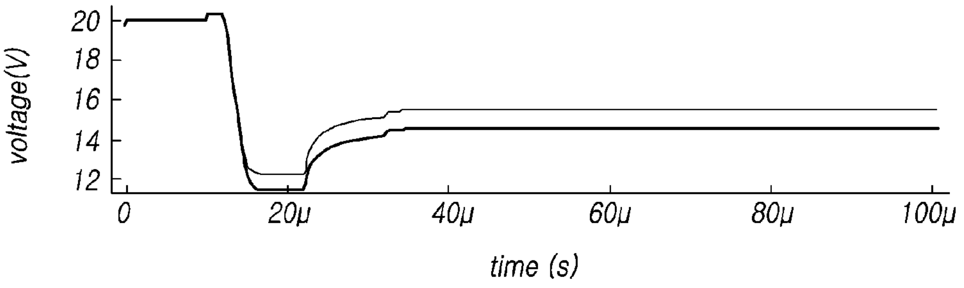
FIGS. 11A, 11B, and 11C are signal waveform views illustrating variations in a current and voltage of a subpixel circuit when a driving transistor has a different threshold voltage in a subpixel circuit according to example embodiments of the present disclosure.
Figure 11B:
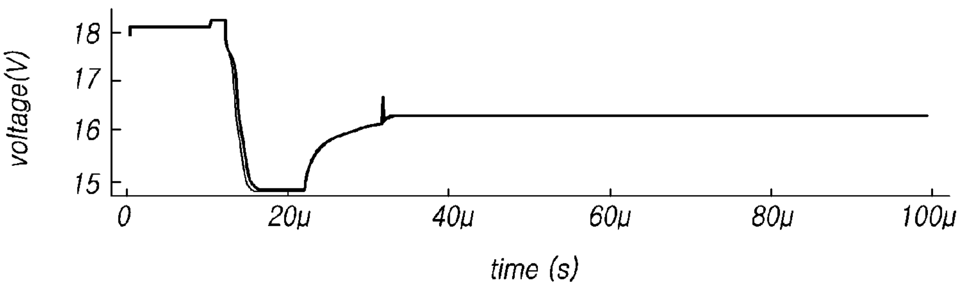
Figure 11C:
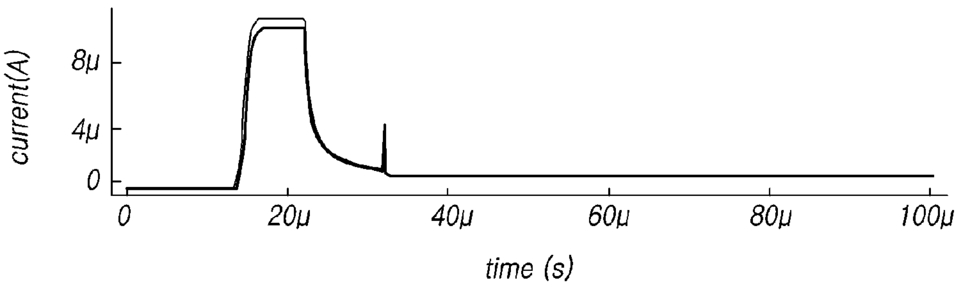

FIGS. 11A, 11B, and 11C are signal waveform views illustrating variations in a current and voltage of a subpixel circuit when a driving transistor has a different threshold voltage in a subpixel circuit according to example embodiments of the present disclosure.

As illustrated in FIGS. 11A, 11B, and 11C, in the subpixel circuit 300 according to example embodiments of the present disclosure, a characteristic value, such as the threshold voltage of the driving transistor Td, may be changed as the driving time increases.

In consideration of this context, in a case where the threshold voltage of the driving transistor Td has a reference voltage and is increased by 1V from the reference voltage, variations in the driving voltage Vd corresponding to the output voltage of the amplification circuit 330, the control voltage Vc corresponding to the output voltage of the reference circuit 310, and the driving current Id flowing through the light emitting circuit 320 were measured.

It could be identified that, when the threshold voltage of the driving transistor Td increased, the level of the driving voltage Vd corresponding to the output voltage of the amplification circuit 330 was varied (case of FIG. 11A).

However, although the threshold voltage of the driving transistor Td increases, the control voltage Vc corresponding to the output voltage of the reference circuit 310 constantly remains at the level corresponding to the sum Vdata+Vth (Tc) of the threshold voltage Vth(Tc) of the control transistor Tc and the data voltage Vdata (case of FIG. 11B).

As a result, the driving current Id flowing through the light emitting circuit 320 and the reference current Iref flowing through the reference circuit 310 may maintain a constant value although the threshold voltage of the driving transistor Td is changed (case of FIG. 11C).

As such, since the driving current Id flowing through the light emitting element ED has a value proportional to the data voltage Vdata regardless of the deterioration of the light emitting element ED or the characteristic value of the driving transistor Td in the subpixel circuit 300 of the disclosure, the display device 100 may maintain uniform luminance although the driving time increases.

In the example subpixel circuit 300 of the present disclosure, the amplification circuit 330 may alternatively reset the driving transistor Td by controlling the power voltage Vp, instead of implementing the reset transistor Trst.

Figure 12:
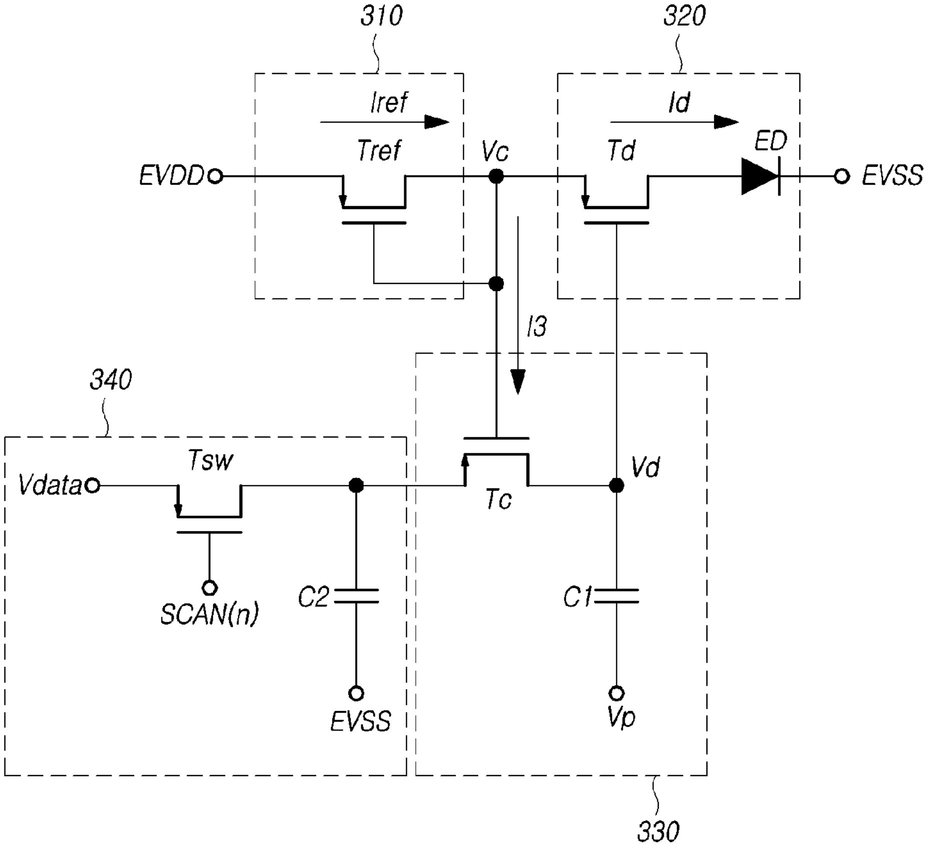
FIG. 12 is a diagram illustrating a detailed configuration of another subpixel circuit according to example embodiments of the present disclosure.

FIG. 12 is a diagram illustrating a detailed configuration of another subpixel circuit according to example embodiments of the present disclosure.

As shown in FIG. 12, a subpixel circuit 300 according to example embodiments of the present disclosure may include a reference circuit 310, a light emitting circuit 320, an amplification circuit 330, and an input circuit 340. Described below is an example in which the n-th scan signal SCAN(n) is applied among the plurality of subpixels constituting the display panel 110.

The reference circuit 310 may include a reference transistor Tref having a drain node and a gate node, at which the control voltage Vc may be provided, and a source node to which a high-potential voltage EVDD may be applied.

The light emitting circuit 320 may include a light emitting element ED having a cathode electrode, to which a low-potential voltage EVSS may be applied, and a driving transistor Td having a drain node connected to the anode electrode of the light emitting element ED, a source node to which the control voltage Vc may be applied, and a gate node to which the driving voltage Vd of the amplification circuit 330 may be applied.

The reference transistor Tref may be turned on by the high-potential voltage EVDD and, when the driving transistor Td is turned on by the driving voltage Vd of the amplification circuit 330, the driving current Id may flow through the light emitting circuit 320.

In this case, when the control voltage Vc and the data voltage Vdata have the same level of potential, the entire reference current Iref flowing through the reference circuit 310 may flow through the light emitting circuit 320, and the driving current Id may have the same value as the reference current Iref.

The amplification circuit 330 may include a control transistor Tc and a first capacitor C1. The control transistor Tc may have a gate node, to which the control voltage Vc may be applied, and a drain node connected to the gate node of the driving transistor Td. The first capacitor C1 may be connected to the drain node of the control transistor Tc to transfer a power voltage Vp for driving the driving transistor Td. The power voltage Vp may have a level capable of driving the driving transistor Td.

The input circuit 340 may include a switching transistor Tsw and a second capacitor C2. The switching transistor Tsw may have a gate node to which the n-th scan signal SCAN(n) may be applied, a source node to which the data voltage Vdata may be applied, and a drain node connected to the source node of the control transistor Tc. The second capacitor C2 may be connected between the drain node of the switching transistor Tsw and the low-potential voltage EVSS.

Accordingly, the input circuit 340 may supply the data voltage Vdata to the amplification circuit 330 by the n-th scan signal SCAN(n). The second capacitor C2 may serve to stably transfer the data voltage Vdata.

The transistors Td, Tref, Tc, and Tsw constituting the example subpixel circuit 300 may be P-type transistors or N-type transistors.

The P-type transistor is relatively more reliable than the N-type transistor. In the case of the P-type transistor, since the driving transistor Td may be fixed to the high-potential voltage EVDD during the period when the light emitting element ED emits light, the current flowing through the light emitting element ED may be supplied stably without significant fluctuation.

When operating in the saturation area, the P-type transistor may flow a constant current regardless of a change in the threshold voltage, providing relatively high reliability.

On the other hand, since the N-type transistor uses electrons, not holes, as carriers, it has higher mobility than the P-type transistor, so that the switching speed may be increased.

The N-type transistor may be an oxide transistor formed of an oxide semiconductor (e.g., a transistor having a channel formed from an oxide semiconductor, such as indium, gallium, zinc oxide, or IGZO). The P-type transistor may be a silicon transistor formed from a semiconductor, such as silicon (e.g., a transistor having a polysilicon channel formed by a low temperature process referred to as LTPS or low temperature polysilicon).

Described here is an example in which the transistors Td, Tref, Tc, and Tsw constituting the subpixel circuit 300 are P-type transistors.

The terms "source node" and "drain node" for the transistors may be interchangeably used depending on the input voltage.

Figure 13:
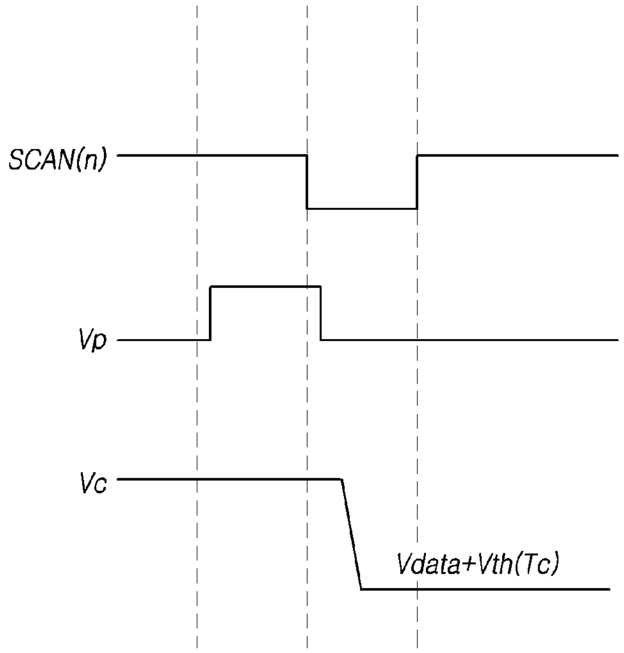
FIG. 13 is an example signal waveform view illustrating operations of another subpixel circuit according to example embodiments of the present disclosure.

FIG. 13 is an example signal waveform view illustrating operations of another subpixel circuit according to example embodiments of the present disclosure.

Described below are operations of the subpixel circuit 300 according to example embodiments of the present disclosure, with reference to FIG. 13.

The power voltage Vp may be applied in the form of a pulse, from the power management circuit 150, according to one or more timing signals.

If the power voltage Vp is applied at a high level before the n-th scan signal SCAN(n) is applied, the driving transistor Td may be turned off by the power voltage Vp.

Thereafter, if the n-th scan signal SCAN(n) is applied to turn on the switching transistor Tsw, the data voltage Vdata may be applied to the second capacitor C2. After the n-th scan signal SCAN(n) is applied, the power voltage Vp may be switched to a low level. If the power voltage Vp reaches the threshold voltage level of the driving transistor Td, the driving transistor Td may be turned on, and the reference current Iref flowing through the reference circuit 310 may be transferred to the light emitting circuit 320 through the driving transistor Td.

The control voltage Vc corresponding to the output voltage of the reference circuit 310 may be decreased by the reference current Iref and the driving current Id flowing from the reference circuit 310 though the light emitting circuit 320.

If the control voltage Vc reaches the sum Vdata+Vth(Tc) of the data voltage Vdata and the threshold voltage Vth(Tc) of the control transistor Tc, the control transistor Tc may be turned on. If the control transistor Tc is turned on, charges stored in the first capacitor C1 may move to the second capacitor C2, so that the driving current Id flowing through the driving transistor Td may decrease. Accordingly, the control voltage Vc may increase, and the control transistor Tc may be turned off.

As the control transistor Tc repeats being turned on and off for short periods of time, the control voltage Vc may maintain the level of the sum Vdata+Vth(Tc) of the data voltage Vdata and the threshold voltage Vth(Tc) of the control transistor Tc.

In this case, if the deposition conditions for the control transistor Tc and the reference transistor Tref positioned adjacent to each other are the same, the threshold voltage Vth(Tc) of the control transistor Tc and the threshold voltage Vth(Tref) of the reference transistor Tref may have the same value. In other words, the control transistor Tc and the reference transistor Tref may be formed to have the same threshold voltage Vth by maintaining the thickness and composition ratio of the gate node, the source node, the drain node, and the insulation film positioned between them under the same conditions in the process of depositing the control transistor Tc and the reference transistor Tref.

If the threshold voltage Vth(Tc) of the control transistor Tc and the threshold voltage Vth(Tref) of the reference transistor Tref have the same value, the reference current Iref flowing through the reference transistor Tref may be expressed as:

$$I\text{ref}=K*V\text{data}^2$$

In other words, as the driving current Id flowing through the light emitting element ED and the reference current Iref flowing through the reference transistor Tref are each proportional to the data voltage Vdata, the driving current Id for driving the light emitting element ED may be adjusted by the data voltage Vdata regardless of the characteristics of the light emitting element ED or the characteristic values of the driving transistor Td.

As a result, the example subpixel circuit 300 of the present disclosure may control to allow the driving current Id flowing through the light emitting element ED to be proportional to the level of the data voltage Vdata by allowing the control voltage Vc corresponding to the output voltage of the reference circuit 310 to remain at the level corresponding to the sum Vdata+Vth(Tc) of the threshold voltage Vth(Tc) of the control transistor Tc and the data voltage Vdata.

Accordingly, in the example subpixel circuit 300 of the present disclosure, a current proportional to the data voltage Vdata may flow through the light emitting element ED regardless of deterioration of the light emitting element ED or the characteristic value of the driving transistor Td. Thus, there may be provided a display panel 110 and a display device 100 having uniform luminance.

The foregoing example embodiments are briefly described below.

A subpixel circuit for operating at least one of a plurality of subpixels disposed on a display panel may include: a reference circuit configured to receive a high-potential voltage and to output a control voltage for controlling a driving current flowing through a light emitting element; a light emitting circuit including the light emitting element, the light emitting circuit being configured to receive the control voltage and a low-potential voltage and to control the light emitting element based on a driving voltage; an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal.

In some embodiments, the reference circuit may include a reference transistor having a drain node and a gate node to provide the control voltage and a source node to receive the high-potential voltage.

In some embodiments, the light emitting circuit may include: the light emitting element having a cathode electrode to receive the low-potential voltage; and a driving transistor having a drain node connected to an anode electrode of the light emitting element and a gate node to receive the driving voltage.

In some embodiments, the amplification circuit may include an operational amplifier having an inverting input terminal to receive the control voltage, a non-inverting input terminal to receive an output voltage of the input circuit, and an output terminal to output the driving voltage.

In some embodiments, the amplification circuit may include: a control transistor having a gate node to receive the control voltage and a drain node to provide the driving voltage to the light emitting circuit; and a first capacitor connected to the drain node of the control transistor to transfer an input power voltage.

In some embodiments, the reference circuit may include a reference transistor having a drain node and a gate node configured to provide the control voltage and a source node configured to receive the high-potential voltage; and the control transistor and the reference transistor may have a same threshold voltage.

In some embodiments, the control transistor and the reference transistor may have at least one of a same thickness, a same composition ratio, and a same structure of a gate node, a source node, a drain node, and an insulation film positioned between the gate node and the source and drain nodes.

In some embodiments, the amplification circuit may further include a reset transistor having a source node to receive a reset voltage, a gate node to receive a second scan signal prior to the input circuit receiving the first scan signal, and a drain node shared with the control transistor.

In some embodiments, the driving transistor may be configured to be reset by the second scan signal and be turned on by the first scan signal.

In some embodiments, with the control voltage at a level corresponding to a sum of the data voltage and a threshold voltage of the control transistor, the driving current flowing through the light emitting circuit and a reference current flowing through the reference circuit may have a same value.

In some embodiments, the input circuit may include: a switching transistor having a gate node to receive the first scan signal, a source node to receive the data voltage, and a drain node connected to the amplification circuit; and a second capacitor connected between the drain node of the switching transistor and the low-potential voltage.

In some embodiments, the light emitting circuit may include a driving transistor having a drain node connected to an anode electrode of the light emitting element and a gate node to receive the driving voltage; and the driving transistor may be configured to be reset by an input power voltage prior to the input circuit receiving the first scan signal and be turned on by the first scan signal.

In some embodiments, the light emitting circuit, the reference circuit, the amplification circuit, and the input circuit may include P-type transistors.

In some embodiments, the driving current may be proportional to the data voltage.

In some embodiments, a display panel may include any of the above embodiments of the subpixel circuit.

A display device may include: a display panel having a plurality of subpixels; a gate driving circuit configured to supply a plurality of scan signals to the display panel respectively through a plurality of gate lines; a data driving circuit configured to supply a plurality of data voltages to the display panel respectively through a plurality of data lines; and a timing controller configured to drive the gate driving circuit and the data driving circuit. Here, at least one of the subpixels may include: a reference circuit configured to receive a high-potential voltage and to output a control voltage for controlling a driving current flowing through a light emitting element; a light emitting circuit including the light emitting element, the light emitting circuit being configured to receive the control voltage and a low-potential voltage and to control the light emitting element based on a driving voltage; an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal.

In some embodiments, the amplification circuit may include: a control transistor having a gate node to receive the control voltage and a drain node to provide the driving voltage to the light emitting circuit; and a first capacitor connected to the drain node of the control transistor to transfer an input power voltage.

In some embodiments, the reference circuit may include a reference transistor having a drain node and a gate node configured to provide the control voltage and a source node configured to receive the high-potential voltage; and the control transistor and the reference transistor may have a same threshold voltage.

In some embodiments, the amplification circuit may further include a reset transistor having a source node to receive a reset voltage, a gate node to receive a second scan signal prior to the input circuit receiving the first scan signal, and a drain node shared with the control transistor; and the driving transistor may be configured to be reset by the second scan signal and be turned on by the first scan signal.

In some embodiments, the driving current is proportional to the data voltage.

The above description has been presented to enable any person skilled in the art to make and use the various possible embodiments of the present disclosure. Although the example embodiments of the present disclosure have been described in more detail with reference to the accompanying drawings, the present disclosure is not limited thereto and may be embodied in many different forms without departing from the technical concept of the present disclosure. Therefore, the example embodiments disclosed in the present disclosure are provided for illustrative purposes only and are not intended to limit the technical concept of the present disclosure. Therefore, it should be understood that the above-described example embodiments are illustrative in all aspects and do not limit the present disclosure.

It will be apparent to those skilled in the art that various modifications and variations can be made in the present disclosure without departing from the spirit or scope of the disclosures. Thus, it is intended that the present disclosure cover such modifications and variations of this disclosure, provided that they come within the scope of the appended claims and their equivalents.

What is claimed is:

1. A subpixel circuit for operating at least one of a plurality of subpixels disposed on a display panel, the subpixel circuit comprising:

a reference circuit configured to receive a high-potential voltage and to output a control voltage for controlling a driving current flowing through a light emitting element;

a light emitting circuit including the light emitting element, the light emitting circuit being configured to receive the control voltage and a low-potential voltage and to control the light emitting element based on a driving voltage;

an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal, wherein the amplification circuit includes:

a control transistor having a gate node to receive the control voltage and a drain node to provide the driving voltage to the light emitting circuit; and a first capacitor connected to the drain node of the control transistor to transfer an input power voltage.

2. The subpixel circuit of claim 1, wherein the reference circuit includes a reference transistor having a drain node and a gate node to provide the control voltage and a source node to receive the high-potential voltage.

3. The subpixel circuit of claim 1, wherein the light emitting circuit includes:

the light emitting element having a cathode electrode to receive the low-potential voltage; and a driving transistor having a drain node connected to an anode electrode of the light emitting element and a gate node to receive the driving voltage.

4. The subpixel circuit of claim 1, wherein the amplification circuit includes an operational amplifier having an inverting input terminal to receive the control voltage, a non-inverting input terminal to receive an output voltage of the input circuit, and an output terminal to output the driving voltage.

5. The subpixel circuit of claim 1 wherein:

the reference circuit includes a reference transistor having a drain node and a gate node configured to provide the control voltage and a source node configured to receive the high-potential voltage; and the control transistor and the reference transistor have a same threshold voltage.

6. The subpixel circuit of claim 5, wherein the control transistor and the reference transistor have at least one of a same thickness, a same composition ratio, and a same structure of a gate node, a source node, a drain node, and an insulation film positioned between the gate node and the source and drain nodes.

7. The subpixel circuit of claim 1, wherein the amplification circuit further includes a reset transistor having a source node to receive a reset voltage, a gate node to receive a second scan signal prior to the input circuit receiving the first scan signal, and a drain node shared with the control transistor.

8. The subpixel circuit of claim 7, wherein the driving transistor is configured to be reset by the second scan signal and be turned on by the first scan signal.

9. The subpixel circuit of claim 1, wherein, with the control voltage at a level corresponding to a sum of the data voltage and a threshold voltage of the control transistor, the driving current flowing through the light emitting circuit and a reference current flowing through the reference circuit have a same value.

10. The subpixel circuit of claim 1, wherein the input circuit includes:

a switching transistor having a gate node to receive the first scan signal, a source node to receive the data voltage, and a drain node connected to the amplification circuit; and a second capacitor connected between the drain node of the switching transistor and the low-potential voltage.

11. The subpixel circuit of claim 10, wherein:

the light emitting circuit includes a driving transistor having a drain node connected to an anode electrode of the light emitting element and a gate node to receive the driving voltage; and the driving transistor is configured to be reset by an input power voltage prior to the input circuit receiving the first scan signal and be turned on by the first scan signal.

12. The subpixel circuit of claim 1, wherein the light emitting circuit, the reference circuit, the amplification circuit, and the input circuit include P-type transistors.

13. The subpixel circuit of claim 1, wherein the driving current is proportional to the data voltage.

14. A display panel comprising the subpixel circuit of claim 1.

15. A display device, comprising:

a display panel having a plurality of subpixels;

a gate driving circuit configured to supply a plurality of scan signals to the display panel respectively through a plurality of gate lines;

a data driving circuit configured to supply a plurality of data voltages to the display panel respectively through a plurality of data lines; and a timing controller configured to drive the gate driving circuit and the data driving circuit, wherein at least one of the subpixels includes:

a reference circuit configured to receive a high-potential voltage and to output a control voltage for controlling a driving current flowing through a light emitting element;

a light emitting circuit including the light emitting element, the light emitting circuit being configured to receive the control voltage and a low-potential voltage and to control the light emitting element based on a driving voltage;

an amplification circuit configured to compare the control voltage and a data voltage to generate the driving voltage for controlling the light emitting circuit; and an input circuit configured to receive the data voltage and a first scan signal and to control a timing of applying the data voltage to the amplification circuit based on the first scan signal, and wherein the amplification circuit includes:

a control transistor having a gate node to receive the control voltage and a drain node to provide the driving voltage to the light emitting circuit; and a first capacitor connected to the drain node of the control transistor to transfer an input power voltage.

16. The display device of claim 15, wherein:

the reference circuit includes a reference transistor having a drain node and a gate node configured to provide the control voltage and a source node configured to receive the high-potential voltage; and the control transistor and the reference transistor have a same threshold voltage.

17. The display device of claim 15, wherein:

the amplification circuit further includes a reset transistor having a source node to receive a reset voltage, a gate node to receive a second scan signal prior to the input circuit receiving the first scan signal, and a drain node shared with the control transistor; and the driving transistor is configured to be reset by the second scan signal and be turned on by the first scan signal.

18. The display device of claim 15, wherein the driving current is proportional to the data voltage.

* * * * *